(12) United States Patent
Lòpez Quirarte (10) Patent No.: US 9,667,809 B1
(45) Date of Patent: May 30, 2017

(54) GLOBAL DATA SERVICE DEVICE CONNECTION MANAGER

(71) Applicant: INTERNATIONAL BUSINESS MACHINES CORPORATION, Armonk, NY (US)

(72) Inventor: Juan Carlos Lòpez Quirarte, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/989,291

(22) Filed: Jan. 6, 2016

(51) Int. Cl.
| | |
|---|---|
| *H04M 11/00* | (2006.01) |
| *H04M 15/00* | (2006.01) |
| *H04L 12/24* | (2006.01) |
| *H04W 4/24* | (2009.01) |
| *G06Q 30/02* | (2012.01) |

(52) U.S. Cl.
CPC .... *H04M 15/8214* (2013.01); *G06Q 30/0283* (2013.01); *H04L 41/5009* (2013.01); *H04L 41/5029* (2013.01); *H04M 15/8083* (2013.01); *H04W 4/24* (2013.01)

(58) Field of Classification Search
None
See application file for complete search history.

(56) References Cited

U.S. PATENT DOCUMENTS

| | | |
|---|---|---|
| 8,300,603 B2 | 10/2012 | Chowdhury et al. |
| 8,457,013 B2 | 6/2013 | Essinger et al. |
| 8,539,040 B2 | 9/2013 | Luna et al. |
| 2006/0031515 A1 | 2/2006 | Van Gassel et al. |
| 2008/0301039 A1* | 12/2008 | Dawson ............... G06Q 20/10 705/39 |
| 2011/0201275 A1 | 8/2011 | Jabara et al. |
| 2011/0269423 A1 | 11/2011 | Schell et al. |
| 2012/0278466 A1 | 11/2012 | Jallapelli et al. |

(Continued)

FOREIGN PATENT DOCUMENTS

WO    WO2014025240 A1    2/2014

OTHER PUBLICATIONS

Peter Mell et al, The NIST Definition of Cloud Computing, National Institute of Standards and Technology, U.S. Department of Commerce, Special Publication 800-145, 2011.

(Continued)

*Primary Examiner* — Suhail Khan
(74) *Attorney, Agent, or Firm* — Patrick J. Daugherty; Driggs, Hogg, Daugherty & Del Zoppo Co., LPA (57) ABSTRACT

A global data service connection manager determines a shared data account balance for data available to a user as a function of data amounts previously made available to a shared data system by the first user for the use of other registered users. In response to a request by the first user to execute a data transaction by using data from the shared system, the shared data account balance and the data available at the brokered purchase price are automatically arbitrated to acquire at least one of data from a wireless service account of another registered user of the shared system in an amount that does not exceed the first user's shared data account balance, and data purchased from a wireless service account of another registered user of the shared system in a purchased amount that does not exceed data available at a brokered purchase price.

20 Claims, 4 Drawing Sheets

(56) References Cited

U.S. PATENT DOCUMENTS

2013/0257657 A1    10/2013   Garin et al.
2015/0065085 A1    3/2015   Sheikh Naziruddin et al.

OTHER PUBLICATIONS

Hengky Susanto et al, Pricing and Revenue Sharing Mechanism for Secondary Redistribution of Data Service or Mobile Devices, PCCC, 2014 IEEE International.
Nicolae-Valentin Ciobanu et al, OpenMobs: Mobile Broadband Internet Connection Sharing, University Politehnica of Bucharest, Faculty of Automatic Control and Computers, 2014.
Hongyi Hu, Massachusetts Institute of Technology, OpenWiFi: a consumer WiFi sharing system, Hari Balakrishnan, 2007.
Dusit Niyato et al, Wireless Broadband Access: WiMAX and Beyond, Integration of WiMAX and WiFi: Optimal Pricing for Bandwidth Sharing, IEEE Communications Magazine, vol. 45, Issue 5, 2007.

\* cited by examiner

GLOBAL DATA SERVICE DEVICE CONNECTION MANAGER

BACKGROUND

Programmable devices may have a number of options to select between to engage in data communications with public and private local area networks (LANs) and wide-area networks, including the internet. For example, a device may select at any given time between available wired Ethernet cable connections to a LAN, wireless network connections to a wireless fidelity ("Wi-Fi") router, and cellular telephone account data service connections.

Wireless connection choices may vary greatly as to levels of service, security attributes, and cost. Some of the differences are based on variations in national or geographic locations. A smart phone or other mobile device with a wireless, satellite or cellular data connection may easily re-establish connections in an area previously visited via the use of credentials acquired and stored during the previous visit, for example in a coffee shop or restaurant that the user regularly patronizes. However, establishing such connections in a new area may be cumbersome or difficult, or expose the user to security risks, for example to the possible cloning or theft of user ID credentials, account information, etc.

Accordingly, users may rely instead on cellular data service plans for their data needs in unfamiliar or new locations away from known secure areas. However, cellular data plans may be limited in the amounts or rates of data available, or available for an efficient pricing. Users exceeding a threshold maximum data allowance per device or per a given time period for each account or user may incur significant financial costs for electing to use cellular data connections over other available options.

BRIEF SUMMARY

In one aspect of the present invention, a method for a global data service connection manager includes determining a shared data account balance for data available to a first user as a function of data amounts previously made available to a shared data system by the first user for the use of other registered users of the shared data system. A current market purchase price is determined for data available now and brokered by the system to the first user from offers available from one or more other registered users of the shared data system. In response to a request by the first user to execute a data transaction for a registered connection by using data from the shared system, the shared data account balance and the data available at the brokered purchase price are automatically arbitrated to acquire at least one of an amount of shared data from a wireless service account of another registered user of the shared system via at least one registered network connection, in a shared amount that does not exceed the shared data account balance of the first user; and an amount of purchased data from a wireless service account of another registered user of the shared system via at least one registered network connection, in a purchased amount that does not exceed an amount of the data available at a brokered purchase price.

In another aspect, a system has a hardware processor in circuit communication with a computer readable memory and a computer-readable storage medium having program instructions stored thereon. The processor executes the program instructions stored on the computer-readable storage medium via the computer readable memory and thereby determines a shared data account balance for data available to a first user as a function of data amounts previously made available to a shared data system by the first user for the use of other registered users of the shared data system. A current market purchase price is determined for data available now and brokered by the system to the first user from offers available from one or more other registered users of the shared data system. In response to a request by the first user to execute a data transaction for a registered connection by using data from the shared system, the shared data account balance and the data available at the brokered purchase price are automatically arbitrated to acquire either at least one of an amount of shared data from a wireless service account of another registered user of the shared system via at least one registered network connection, in a shared amount that does not exceed the shared data account balance of the first user; and an amount of purchased data from a wireless service account of another registered user of the shared system via at least one registered network connection, in a purchased amount that does not exceed an amount of the data available at a brokered purchase price.

In another aspect, a computer program product for a global data service connection manager has a computer-readable storage medium with computer readable program code embodied therewith. The computer readable hardware medium is not a transitory signal per se. The computer readable program code includes instructions for execution which cause the processor to determine a shared data account balance for data available to a first user as a function of data amounts previously made available to a shared data system by the first user for the use of other registered users of the shared data system. A current market purchase price is determined for data available now and brokered by the system to the first user from offers available from one or more other registered users of the shared data system. In response to a request by the first user to execute a data transaction for a registered connection by using data from the shared system, the shared data account balance and the data available at the brokered purchase price are automatically arbitrated to acquire at least one of an amount of shared data from a wireless service account of another registered user of the shared system via at least one registered network connection, in a shared amount that does not exceed the shared data account balance of the first user; and an amount of purchased data from a wireless service account of another registered user of the shared system via at least one registered network connection, in a purchased amount that does not exceed an amount of the data available at a brokered purchase price.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
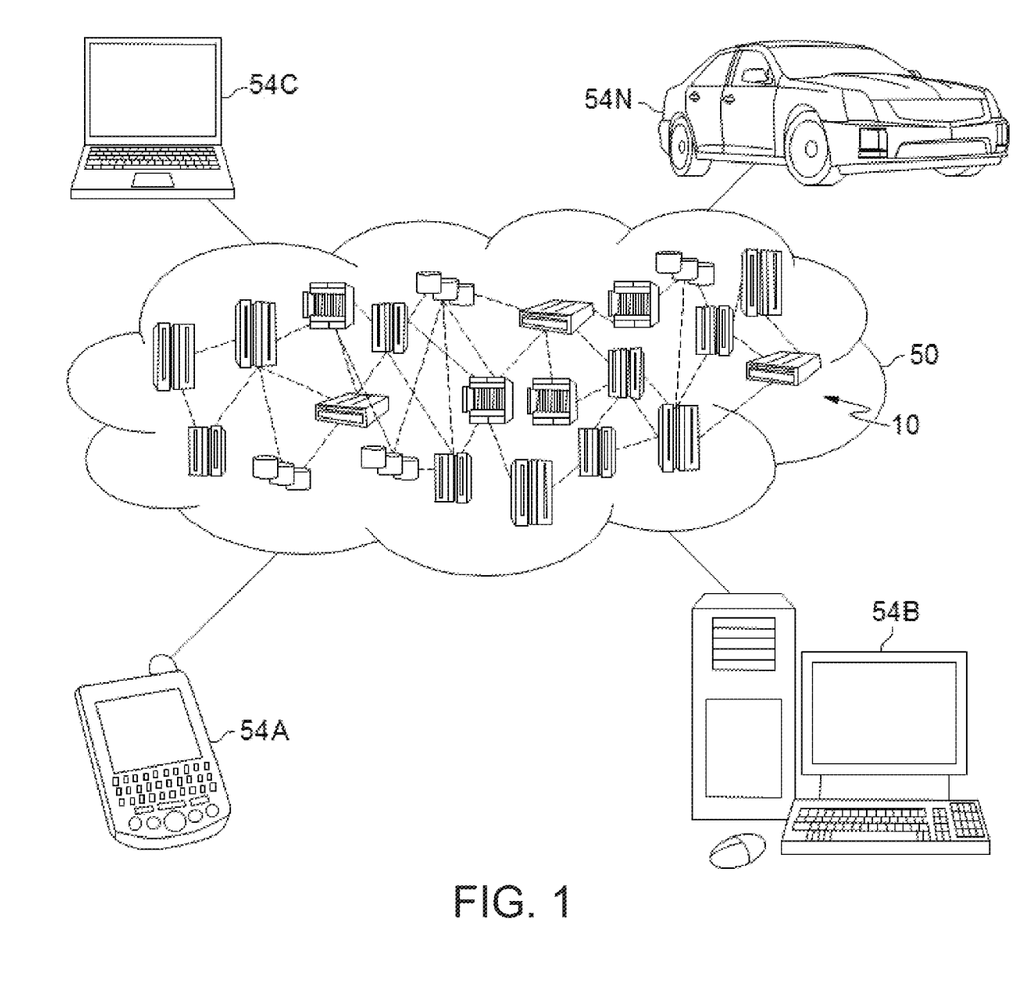
FIG. 1 depicts a cloud computing node according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
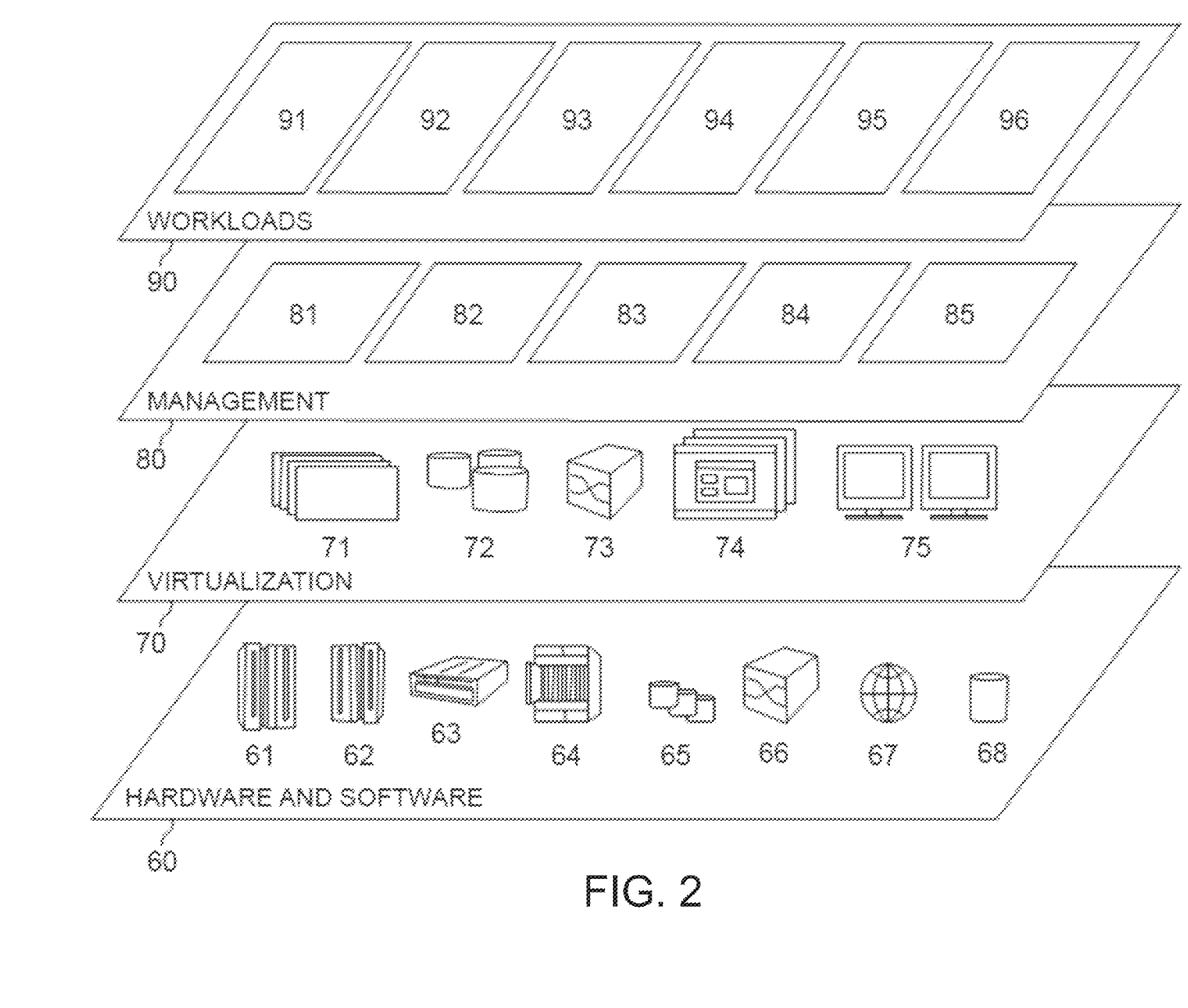
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for a global data service connection manager as described below.

Figure 3:
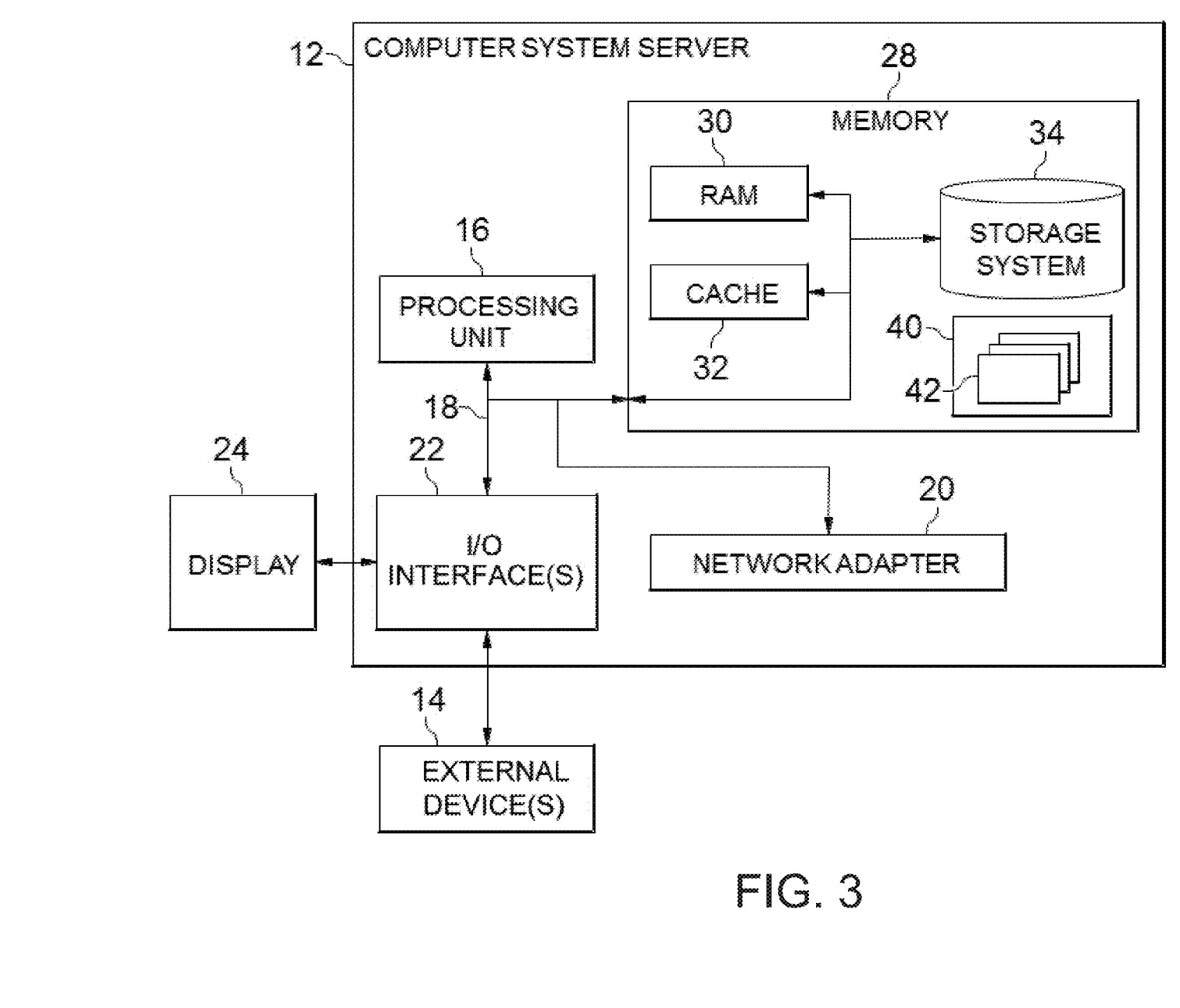
FIG. 3 depicts a computerized aspect according to an embodiment of the present invention.

FIG. 3 is a schematic of an example of a programmable device implementation of a computer node according to an aspect of the present invention, which may function as a cloud computing node within the cloud computing environment of FIG. 2. Programmable device implementation is only one example of a suitable implementation and is not intended to suggest any limitation as to the scope of use or functionality of embodiments of the invention described herein. Regardless, the programmable device implementation is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
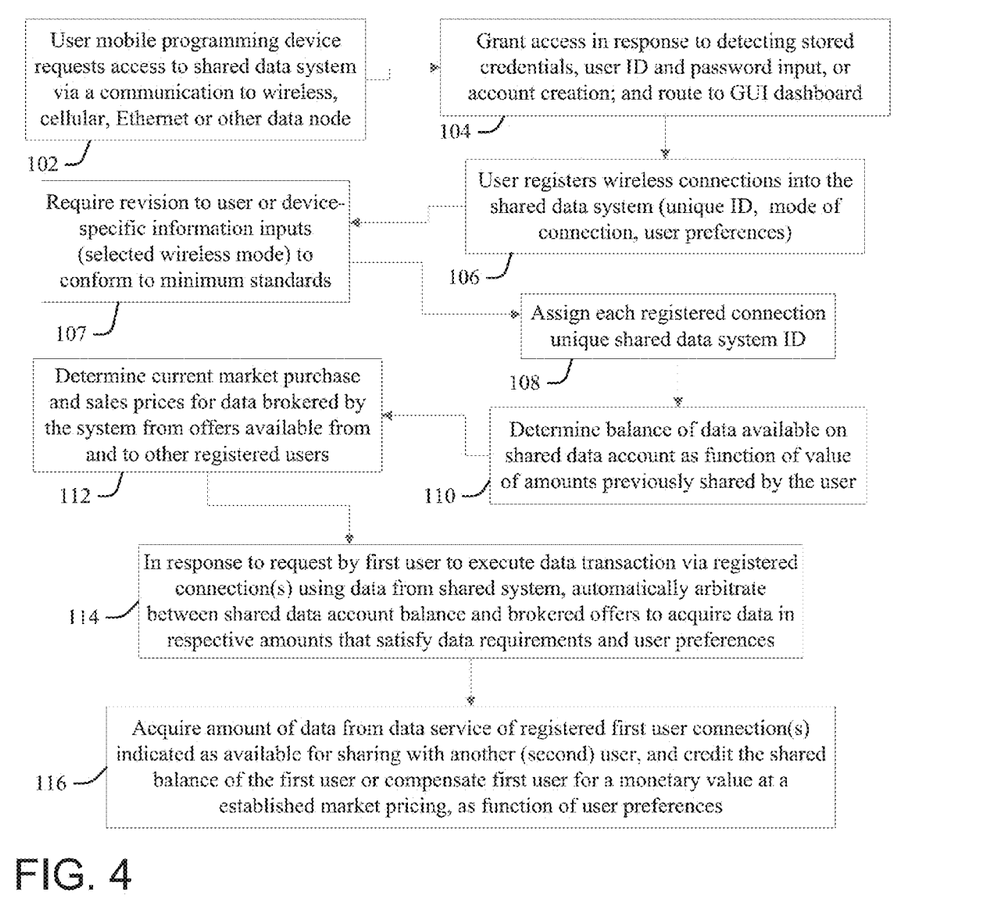
FIG. 4 is a flow chart illustration of a method or process according to an aspect of the present invention.

FIG. 4 (or "FIG. 4") illustrates a computer implemented (method or process) of an aspect of the present invention for a global data service connection manager. A processor (for example, a central processing unit (CPU)) executes code, such as code installed on a storage device in communication with the processor, and thereby performs the process step elements illustrated in FIG. 4.

At 102, a requesting (first) user requests access to a shared data system according to the present invention, via a communication of a mobile programming device to a wireless, cellular, Ethernet or other data node of the system.

At 104, access is granted to the shared data system to the first user, in response to detecting cookies or other credentials stored on the user device; in response to input of the user ID and password created above at 102 or previously, etc.; or in response to a creation of an account by the first user, wherein the first user is routed to a graphical user interface (GUI) dashboard or panel that is displayed to the user on a display device included within or in communication with the users programmable device. If the request at 102 is the first time the user has requested access to the system resources, the first user is generally required to register at 104, for example via accessing into a registration link within an index wherein the user enters general unique user identification information and device-specific information (this may include hardware identification indicia or http addresses acquired in the background, without user action or intervention). Thus, the system may then create a unique user identification ("ID") and password for the first user to access the shared data account in granting access at 104.

At 106, the user uses the dashboard to register his one or more of the user's currently available wireless connections into the shared data system, for example by entering unique user and/or device-specific identity (ID) information, for example media access control (MAC) address, Wi-Fi identifier and/or password. The registration information may also include mobile device attributes relevant to the transfer or receipt of data via the connection, type of cellular data network a device is currently using or capable of using (Code Division Multiple Access (CDMA), Global System for Mobile communication (GSM), Long Term Evolution (LTE), version or speed quality thereof such as 3G, 4G, Edge, etc.) The registration information may also include user preferences, including threshold maximum data amounts or rates that the user will purchase at market rates through the system (as discussed below), specific days to purchase data or share data with others via the connection, specific hours to share the connection, etc.

In some aspects at 107, the system reviews the registration information provided by the user and requests that the user revise one or more of the user and/or device-specific information inputs to conform to minimum standards or otherwise enhance ease or stability of connection to the shared data system. For example, the user may be prompted at 107 to select a preferred connection if alternatives are available, such as Wi-Fi instead of Bluetooth® or Airdrop®) (BLUETOOTH is a registered trademark of Bluetooth SIG in the United States and other countries; AIRDROP is a registered trademark of Apple, Inc. in the United States and other countries.) The user may also be prompted at 107 to create unique names for the registered connections that are sufficiently distinct from other connection names and complex enough to reduce probabilities that the name can be replicated by an unauthorized user. In some aspects the user is given a separate panel at 107 to edit the connection information as needed.

Thus, at 108 each connection established (registered) by the user at 106 (and approved at 107) is assigned a unique identifier within the shared data system (for example, "MXGDL345820").

At 110 the system determines a shared data account balance for the user of data available via the registered connections. The shared data account balance is determined to correspond to a value of data amounts previously made available or provided to the system by the user for the use of other users within the system, for example over a certain time period, such as during a current or last monthly or other billing period of a cellular data service provider, or as a running amount aggregated over time, less data acquired by the user from the system.

At 112 the system determines a current market purchase price for data available now and brokered by the system to the first user from offers available from one or more other ("second") registered users, and/or a current market sales price for consideration to the first user for the sale of amounts of data service of the registered connection(s) of the first user to the system for sharing with the other registered users.

At 114, in response to a request by the first user to execute a data transaction for his or her registered connections using data from the shared system, the system automatically arbitrates between the shared data account balance and the brokered offered amounts to acquire data in respective amounts from either or both of the accounts that satisfy data requirements and user preferences. More particularly, the amounts of shared data and purchased data are acquired from wireless service accounts or devices of other registered user of the shared system via network connections registered on the shared system.

Examples of the requested data transaction include a request to access the internet via a web browser, to stream video or audio data via a browser or application from a designated internet protocol address site, to upload video or image or other data to a cloud storage address, and still others will be apparent to one skilled in the art.

In some examples, the user preferences provide a default setting wherein data is acquired entirely first from the shared data account balance until that balance is exhausted (is no longer a positive value), and then the remainder of what is needed to satisfy the data request is progressively purchase from lowest priced ones of the brokered offers from the second registered user(s) until each of the lowest priced offer amounts are progressively exhausted, and then from a next lowest-price offer, etc.

Alternative user settings or preferences may cause the arbitration at 114 to select based on the brokered offer pricing, automatically acquiring data first from the lowest priced ones of the brokered offers from the second registered user(s) until the brokered price of remaining offers exceeds a maximum threshold, wherein additional required amounts are acquired from the shared data account balance until the balance is exhausted (is no longer a positive value), and then remainder amounts are progressively purchased again from a next lowest-price offer, etc.

At step 116, the shared system acquires an amount of data from a cellular or other data service of one or more of the registered first user connections for the use of another (second) user of the shared service system and credits the shared balance of the first user or compensates the first user for a monetary value of the acquired data at a market pricing established by the system, as a function of user preferences.

Wherein two or more registered connections are available to a requesting user, aspects may enable the simultaneous use of multiple connections for getting data (for example at 114 or 116, FIG. 4), increasing significantly the amount of bandwidth available to the requester, and in some redundant configurations ensuring zero downtime due to loss of any connection.

In some embodiments, a dashboard is evoked (for example, at 114 or 116, FIG. 4) that displays the shared data account balance and the brokered offer and selling prices for the first user data intake and output (sharing), wherein the first user may confirm or override the default data acquisition arbitration and sales settings. The user may use the dashboard to check the status of the connections registered, totals or subtotal amounts of data transferred or received, current connections, connections history, balances of data enabled to transfer to other users via the system (e.g. 2 of 6 GB), associated billing or pre-authorized credit cards, etc., and use this data to make informed arbitration decisions between the shared data account balance and the brokered offer amounts and prices. Thus, the first user may elect to override an automated selection of using the shared data account balance to acquire data (at 114, FIG. 4) to save or bank the shared data balance for a future use and instead purchase all of the currently needed data from the brokered offers, for example in view of expecting or anticipating higher costs or needs for data in the future.

Account data balance information conveyed by the dashboard (at 114 or 116, FIG. 4) may indicate current value in one or more currencies of the data usage amount balances (for example, United States dollars ($ USD), Euros, Yuan, Bitcoin, etc.) of amounts currently or historically received or transferred, and of balances currently available to sell to other users or third parties. This data may be further dependent on and categorized with respect to each of a plurality of connections registered and enabled by the user.

Pricing and values may be determined (at 110 and 112, FIG. 4) using offer and demand logic and algorithms as a function of a quality of the mode or type of a user connection, type of data transaction requested and user ID indicia. For example, a quantity of data made available through a first Asymmetric digital subscriber line (ASDL) connection that has an upload transfer speed limited to five megabytes per second may have a lower price or value than the same quantity offered through a second, IEEE 802.11n Wi-Fi connection that has a data transfer speed of 600 megabytes per second. Pricing may also be differentiated as to whether the buyer or seller is in or out of the shared data system, for example quoting a selling price to other registered users within the shared data system at $2.00 USD per gigabyte (GB) and $2.50 USD per GB to non-registered users.

Aspects may set data sales and purchase pricing, and amount values of data shared, as a function of cellular pricing structures. For example, a given cellular provider may vary pricing charged to a user based on total amounts of data used in a given billing period, with different amounts billed at different rates per amount used, and wherein said rates will also vary based on usage location (international versus national usage, land usage versus plane or ship usage, etc.

Determining or predicting data amounts needed to satisfy a shared data request, and to set brokered purchasing and sales pricing, may also be based on historic user data. For example, the type of the transaction of a user's data request may be identified, and average historic data amount for such a transaction be used to predict or estimate how much shared or purchased data must be acquired to satisfy the transaction, and wherein the user must have enough financial credit to support the amount of the transaction at the current brokered sharing or purchase or sales rate to go forward with the transaction.

The dashboards may also enable the user to edit or revise this information as needed, including replacing a first registered connection with a second, higher data rate connection. This may result in an increase in brokered purchase prices or brokered sales prices, reflecting a higher value for data balances offered for use (sharing) to other system users, or a more expensive cost for using the higher-speed connection to access data usage by the user.

In some aspects the user may voluntarily decline an offer to sell to another registered user (at 116, FIG. 4) and await an offer from another for a higher price. In some examples this right may be restricted, such as to when no other registered users are making purchase offers.

Aspects may also build in a spread between purchase and sell pricing to cover expenses or to provide revenue to a service provider managing and operating the shared data system, for example, selling for US$2.50 a data usage amount that is purchased from another registered user at US$2.30.

The dashboards displayed may be customized to corporate users that administer or oversee a plurality (two or more) of accounts, optionally including accounts of other users, junior users, heads of family households, or managers or supervisors within companies, enterprises, and governmental and non-governmental agencies and organizations. Thus, an administrator may use a dashboard to manage budgets by company area, print lists of users, edit user information, check current and historic transactions for each user and manage the data assigned to each user (transfer, assign, remove, etc.). The dashboard can be modified to adapt to small and medium-sized enterprises (SME's), family plans, college plans, governmental agencies, organization flow charts, etc.

The shared system acts as a broker, wherein in response to selection of the shared system data usage (at 114, FIG. 4) the first user's registered device connects with a device of the other, second user, for example via internet hypertext transfer protocol ("http") address, or a LAN, Wi-Fi or direct mobile-to-mobile connection such as BLUETOOTH, AIR-DROP etc. This enables the first user to access a data service of the device of the second user in an amount that is within or otherwise authorized by the positive shared data account balance.

In establishing data connections and transfers (at 114 and 116, FIG. 4) the process dynamically monitors current user balance values for shared system data usage, and if the user doesn't have a sufficient balance to support a requested data usage the connection ends with a message informing the user. Where the users have respective sufficient, positive balances the system opens requested connections, enables data usage by a requesting user via the shared connections and keeps a running tally of the amount of data used, dynamically decreasing the positive balance of the requesting user and increasing a positive balance of the other user supplying the external data usage amount to the requesting user in amounts that are directly related to or proportional or otherwise determined as a function of the amount of data usage consumed by the requesting user. The processes may continue (at 114 or 116, FIG. 4) until terminated in response to one user ending the connection, or to the shared system account balance of a requesting user dropping below a positive value in the case of shared data account balances.

For acquisition of data at brokered market rates a purchasing user may initiate connections into shared connections that are inside and registered on the shared system, or on connections that are outside of the system or actively registered. Aspects validate that requesting user have a cash or credit account with a positive balance in currency, or pre-authorized to purchase data usage at the brokered market rate in an amount sufficient to purchase requested data, otherwise the requester cannot access the other connections, and the connections may be terminated with an appropriate message. Aspects also confirm that the quoted price or rate of the requested data is within user defined parameters (maximum price specifications); if not, the user is informed and given the option to override the conditions or price limits and open the connection and execute the purchase at the non-conforming conditions or price.

If an external connection is registered to another user on the shared system, the data usage shared for monetary consideration is tracked with respect to both users. This may entail the shared data system reducing a requester balance and increasing a balance of the external user that is sharing the connection, for embodiments that track and perhaps limit the direct purchasing of shared data usage outside of the sharing framework. The process continues until terminated in response to one of the users ending the connection, or to the cash or pre-authorized purchasing balance of the requesting user dropping below a value sufficient to purchase additional shared data.

Prior art methods for managing wireless data communications for a mobile programmable device present problems in efficiently managing selections between available options. While connections are commonly established in the background in areas previously visited by a user with the device without requiring any action by the user (via the use of credentials acquired and stored during a previous visit), this convenience is not available for a first visit to a new place or area for which stored credentials are not recognized. Further, current solutions generally present multiple offers to join free public Wi-Fi connections, without distinguishing the options meaningfully based connection quality, bandwidth or security attributes.

If the user is not willing to take the time to establish new Wi-Fi credentials for new options presented for selection, the user generally relies on cellular data communications that are authorized pursuant to a user account. As the user must generally pay for cellular data service, they must expend financial assets to maintain the cellular service, and in some examples pay additional fees for usage over monthly allotments which would be unnecessary if publicly available Wi-Fi will serve their needs and are instead selected.

Alternatively, users may needlessly expose themselves to security risks by using non-secure, public Wi-Fi options when their cellular data usage is well under the limit imposed by their monthly allotment. In such a scenario the user would be better served to maintain better, enhanced security and use their cellular data plan instead. Further, as unused data allotments typically expire at the end of each billing period, failing to use all of the data allotted for a given billing period needlessly wastes financial resources of a user.

Aspects of the present invention create applications executing on a variety of platforms (personal computer, mobile phone, tablet, global positioning satellite (GPS) device, etc.) that manage a plurality of data connections registered to a user (or organization associated with the user) wherein data allotments may be shared or allocated between users. The aspects monitor amounts of the data shared with or obtained from other registered users to generate a shared data system account balance report for each user that indicates amounts for each individual user of data used, shared, purchased, sold or available. A positive account balance for available quantified data usage generally enables the user to connect their devices (sometimes to sources linked to the shared account), via registered hotspots, Wi-Fi, BLUETOOTH, AIRDROP and other user devices to access amounts of data usage enabled by the positive balance, in some cases via connected other users.

According to the present invention the term "data usage amount" will be understood to represent any or one more different quantified amounts of data usage or access received and sent during a billing or other time period that comprehends size (for example, megabytes (MB's), data rates (MB/time period such as millisecond, second, minute, hour, etc.), time or rate (seconds or minutes at a specified maximum number of MB's per the second or minute timeframe, etc.), or a combinations thereof.

If the user cannot find a connection to share and use the positive balance, the applications may also automatically purchase data credits (MB's, connection time amounts for a specified maximum data rate usage, etc.) using pre-authorized credit cards, bank accounts, etc., at a market rate or at another rate or price calculated by the application (for example, as a function of current offer and demand data and conditions).

Aspects enable the user to sell unused or excess data allotments from their own data plan to other users at a rate or price calculated by the application or a market rate, as well as to sell the data to other users who are not registered within and are outside of the shared data system, optionally at market or different pricing. Some aspects define terms and associated values that quantify and distinguish mobile and non-mobile device data usage and sharing. One example defines "V-Quir" as a unit of measure of gigabytes (GB) acquired by a user via sharing non-mobile connections (for example, an Ethernet connection to a LAN), and "M-Quir" as a unit of measure of GB acquired by sharing mobile connections, wherein each has value defined by a currency standard (for example: United States dollars (USD), Euros (EUR), Bitcoin, etc.).

Aspects measure or trace amounts or rates of data information received and sent from or to other registered devices, creating a data usage amount balance value that indicates to each user quantified amount of data available from the shared data system. Positive balances can be used to connect a user device by an associated registered account to other devices, and to receive or send data from or to them in amounts or at rates, etc., enabled by the positive balance. In some aspects a negative balance enables the user to automatically purchase data in the background (via prepaid accounts, pre-authorized credit or checking account debits, etc.), which may be encouraged and enabled by setting purchase prices as a fraction of current market pricing otherwise available to the user from sources outside of the present embodiment system.

Aspects provide advantages in establishing a new paradigm for efficient access to and use of data resources, which may be offered to users globally, irrespective of the locations of individual users, creating a worldwide shared data net. Data telecommunications are offered and used via a new and novel platform that enables the trade of data services between countries, people, companies, transforming a local data service resource into a global market commodity. The price per units of data service is dynamic and dictated by the offer/demand between "senders" and "receivers".

Aspects determine market pricing for brokered data services as a function of national location pricing applicable to each user. Cellular data service costs may vary greatly between different regions within a country, countries, commonwealth of multi-national trading blocs and cooperative economic structures (for example, the European Union (EU) as compared to regions outside of the EU). Aspects dynamically determine the different pricing structures that apply to users as they move between different locations, and thereby automatically select lowest cost options for a user at any given time and current location.

The platforms created by aspects of the present invention enable organizations (corporations, governments, non-governments agencies, etc.) to buy or sell data in response to macro and micro economic policies, demand and current and available data service scope and coverage. Availability of such platforms may encourage service providers to build additional infrastructure, including new high-power, long-range routers in order to provide a stronger and longer range signal coverage that may be marketed or otherwise provided to more users. New, lower-cost options may also be provided for some users, for example if user data consumption is low then the user may be better served by cancelling home or office Wi-Fi data services and instead buying the needed data service from other registered users.

Aspects may provide or increase services in geographic areas that are underserved by data communication options. For example, there are many places where no Internet connection is available at all, particularly in under-developed third world regions of the world. Aspects provide a platform wherein registered users may set up hotspots in such areas and globally offer excess portions of their data service capabilities to all local users able to engage the service (via the registration processes at 106 of FIG. 4. Aspects provide the necessary connection infrastructure and automatically set pricing in the background, without requiring any effort on the part of the individual user offering data to share and thereby encouraging the quick and efficient spread of wireless data services to under-served regions. Market values may also be defined as a function of localized currencies of exchange, for example 100 MB of data may be priced with respect different quantities of goods or services as valued within each particular region.

Aspect interfaces may be centralized and manage entirely within service provider firewalls, enabling the use of robust and secure encryption techniques, data bases, human resources, locations, web servers, etc. Aspect applications may use different software languages and platforms, depending on the device to be installed.

Service providers may also realize or enhance revenue by including marketing advertisements ("ads") within the application, and selling data for use with the registered accounts through retail or third party suppliers, for example, via data or gift cards in convenience stores. Service providers may also enter into agreements and joint ventures with data providers in multiple and diverse national and geographically separate locations, to expand and enable the opportunities for registered users within locations with limited or no reliable Wi-Fi signal. Programs and applications may provide notice of available locations via plotting hotspots and affiliated devices on graphic and interactive maps, enabling rapid result returns for a current location determined via GPS device data or via mapping application searches.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a global data service connection manager, the method comprising executing on a computer processor the steps of:
    determining a shared data account balance for data available to a first user as a function of data amounts previously made available to a shared data system by the first user for the use of another registered user of the shared data system;
    determining a current market purchase price for data available now and brokered by the system to the first user from offers available from at least one other registered user of the shared data system; and
    in response to a first request by the first user to execute a data transaction for a registered connection by using data from the shared system, automatically arbitrating between the shared data account balance and the data available at the brokered purchase price to acquire at least one of:
    an amount of shared data from at least one wireless service account of another registered user of the shared system via at least one network connection registered on the shared system, in a shared amount that does not exceed the shared data account balance of the first user; and
    an amount of purchased data from at least one wireless service account of another registered user of the shared system via at least one network connection registered on the shared system, in a purchased amount that does not exceed an amount of the data available at a brokered purchase price.

2. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the steps of determining the shared data account balance for data available to the first user as the function of data amounts previously made available to the shared data system by the first user for the use of another registered user of the shared data system, determining the current market purchase price for data available now and brokered by the system to the first user from offers available from at least one other registered user of the shared data system, and automatically arbitrating between the shared data account balance and the data available at the brokered purchase price to acquire the at least one of the amount of shared data from the at least one wireless service account of the another registered user of the shared system via the at least one network connection registered on the shared system in the shared amount that does not exceed the shared data account balance of the first user, and the amount of purchased data from the at least one wireless service account of the another registered user of the shared system via the least one network connection registered on the shared system in the purchased amount that does not exceed the amount of the data available at the brokered purchase price.

3. The method of claim 2, wherein the computer-readable program code is provided as a service in a cloud environment.

4. The method of claim 1, wherein the step of determining the shared data account balance for data available to the first user is a function of data amounts previously made available to the shared data system by the first user for the use of the second user over a certain time period, such as during a current or last billing period of a cellular data service provider.

5. The method of claim 1, further comprising:
dynamically increasing the shared balance of the first user as a function of amounts of data acquired by another user of the shared service system from a registered cellular or other data service connection of the first user.

6. The method of claim 1, further comprising:
dynamically reducing the shared data account balance for data available to the first user in an amount that corresponds to the amount of shared data acquired by the first user from the at least one wireless service account of another registered user of the shared system via at least one network connection registered on the shared system.

7. The method of claim 1, wherein the step of automatically arbitrating between the shared data account balance and the data available at the brokered purchase price to acquire the data in the respective amounts comprises:
acquiring the shared data from the at least one wireless service account of the another registered user of the shared system until the acquired amount of data equals the shared data account balance of the first user; and
acquiring the amount of purchased data in response to the acquired amount of the shared data equaling the shared data account balance of the first user; and
wherein a total of the shared amount and the purchased amount satisfies a data requirement of the first request.

8. The method of claim 7, wherein the step of acquiring the purchased amount of data comprises:
acquiring a first portion amount of the purchased amount of data from a lowest priced offer of the first portion amount of a plurality of brokered offers from other registered users of the shared system; and
acquiring a remainder portion amount of the purchased amount of data from a next lowest priced offer of the remainder portion amount of the plurality of brokered offers.

9. The method of claim 1, further comprising:
determining a brokered sales price for consideration to the first user for sale of amounts of data service of a registered cellular or other data service connection of the first user to the system for sharing with the other registered users; and
compensating the first user for a monetary value, determined as a function of the brokered sales price, for an amount of data acquired by another user of the shared service system from the registered cellular or other data service connection of the first user.

10. The method of claim 9, further comprising:
increasing at least one of the brokered sales price and the brokered purchase price in response to replacing a first registered connection with a second, higher-data rate registered connection.

11. The method of claim 10, wherein the first requested data transaction comprises at least one of an access via a web browser to the internet to stream video or audio data, or to upload video or image or other data to a cloud storage address.

12. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines a shared data account balance for data available to a first user as a function of data amounts previously made available to a shared data system by the first user for the use of another registered user of the shared data system;
determines a current market purchase price for data available now and brokered by the system to the first user from offers available from at least one other registered user of the shared data system; and
in response to a first request by the first user to execute a data transaction for a registered connection by using data from the shared system, automatically arbitrates between the shared data account balance and the data available at the brokered purchase price to acquire at least one of:
an amount of shared data from at least one wireless service account of another registered user of the shared system via at least one network connection registered on the shared system, in a shared amount that does not exceed the shared data account balance of the first user; and
an amount of purchased data from at least one wireless service account of another registered user of the shared system via at least one network connection registered on the shared system, in a purchased amount that does not exceed an amount of the data available at a brokered purchase price.

13. The system of claim 12, wherein the processor executes the program instructions stored on the computer-readable storage medium via the computer readable memory and thereby further automatically arbitrates between the shared data account balance and the data available at the brokered purchase price to acquire the data in the respective amounts by:
acquiring the shared data from the at least one wireless service account of the another registered user of the shared system until the acquired amount of data equals the shared data account balance of the first user; and
acquiring the amount of purchased data in response to the acquired amount of the shared data equaling the shared data account balance of the first user; and
wherein a total of the shared amount and the purchased amount satisfies a data requirement of the first request.

14. The system of claim 13, wherein the processor executes the program instructions stored on the computer-readable storage medium via the computer readable memory and thereby further acquires the purchased amount of data by:
acquiring a first portion amount of the purchased amount of data from a lowest priced offer of the first portion amount of a plurality of brokered offers from other registered users of the shared system; and
acquiring a remainder portion amount of the purchased amount of data from a next lowest priced offer of the remainder portion amount of the plurality of brokered offers.

15. The system of claim 12, wherein the processor executes the program instructions stored on the computer-readable storage medium via the computer readable memory and thereby further:
determines a brokered sales price for consideration to the first user for sale of amounts of data service of a registered cellular or other data service connection of the first user to the system for sharing with the other registered users; and
compensates the first user for a monetary value, determined as a function of the brokered sales price, for an amount of data acquired by another user of the shared service system from the registered cellular or other data service connection of the first user.

16. The system of claim 15, wherein the processor executes the program instructions stored on the computer-readable storage medium via the computer readable memory and thereby further:
increases at least one of the brokered sales price and the brokered purchase price in response to replacing a first registered connection with a second, higher-data rate registered connection.

17. A computer program product for a global data service connection manager, the computer program product comprising:
a computer readable storage medium having computer readable program code embodied therewith, wherein the computer readable storage medium is not a transitory signal per se, the computer readable program code comprising instructions for execution by a processor that cause the processor to:
determine a shared data account balance for data available to a first user as a function of data amounts previously made available to a shared data system by the first user for the use of another registered user of the shared data system;
determine a current market purchase price for data available now and brokered by the system to the first user from offers available from at least one other registered user of the shared data system; and
in response to a first request by the first user to execute a data transaction for a registered connection by using data from the shared system, automatically arbitrate between the shared data account balance and the data available at the brokered purchase price to acquire at least one of:
an amount of shared data from at least one wireless service account of another registered user of the shared system via at least one network connection registered on the shared system, in a shared amount that does not exceed the shared data account balance of the first user; and
an amount of purchased data from at least one wireless service account of another registered user of the shared system via at least one network connection registered on the shared system, in a purchased amount that does not exceed an amount of the data available at a brokered purchase price.

18. The computer program product of claim 17, wherein the computer readable program code instructions for execution by the processor further cause the processor to automatically arbitrate between the shared data account balance and the data available at the brokered purchase price to acquire the data in the respective amounts by:
acquiring the shared data from the at least one wireless service account of the another registered user of the shared system until the acquired amount of data equals the shared data account balance of the first user; and
acquiring the amount of purchased data in response to the acquired amount of the shared data equaling the shared data account balance of the first user; and
wherein a total of the shared amount and the purchased amount satisfies a data requirement of the first request.

19. The computer program product of claim 18, wherein the computer readable program code instructions for execution by the processor further cause the processor to acquire the purchased amount of data by:
acquiring a first portion amount of the purchased amount of data from a lowest priced offer of the first portion amount of a plurality of brokered offers from other registered users of the shared system; and
acquiring a remainder portion amount of the purchased amount of data from a next lowest priced offer of the remainder portion amount of the plurality of brokered offers.

20. The computer program product of claim 17, wherein the computer readable program code instructions for execution by the processor further cause the processor to:
determine a brokered sales price for consideration to the first user for sale of amounts of data service of a registered cellular or other data service connection of the first user to the system for sharing with the other registered users; and
compensate the first user for a monetary value, determined as a function of the brokered sales price, for an amount of data acquired by another user of the shared service system from the registered cellular or other data service connection of the first user.

* * * * *